July 8, 1958     W. DU BROFF     2,842,716
SEQUENCE VOLTAGE CONTROL SYSTEM AND METHOD
Filed March 17, 1954
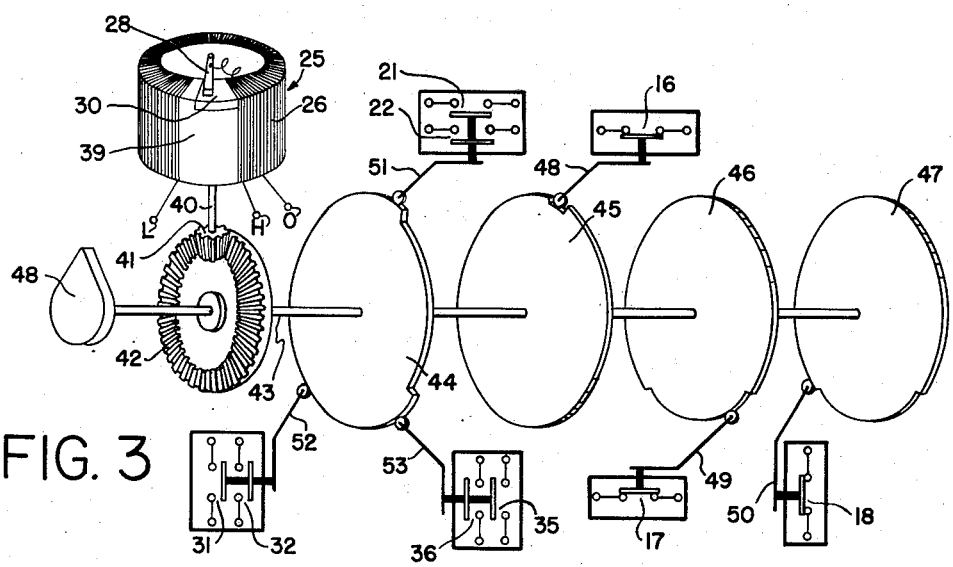
FIG. 3
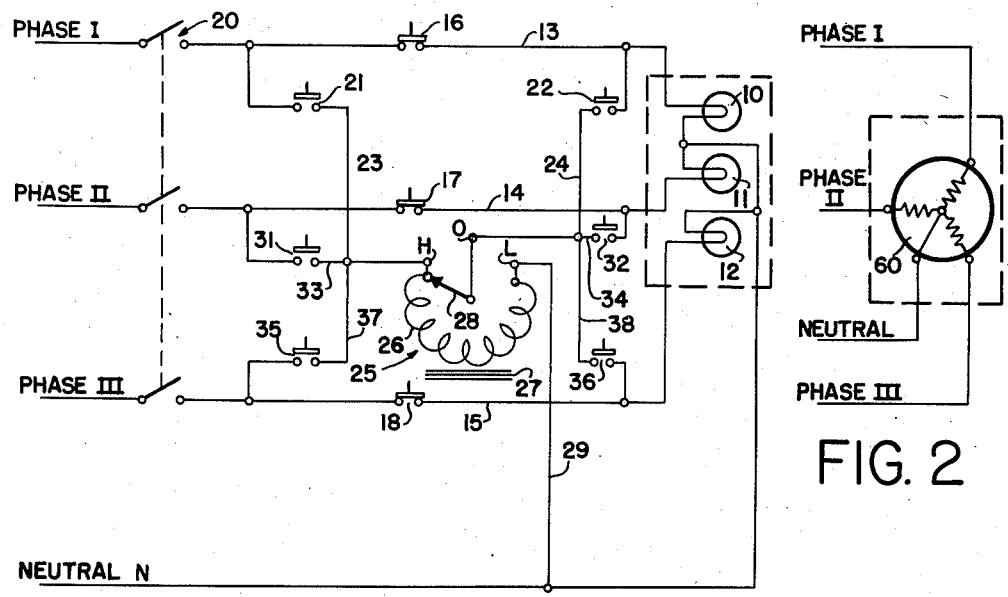
FIG. 1
FIG. 2
INVENTOR.
WARREN DUBROFF
BY
ATTORNEY

United States Patent Office 2,842,716
Patented July 8, 1958

2,842,716

SEQUENCE VOLTAGE CONTROL SYSTEM AND METHOD

Warren Du Broff, Highland Park, Ill.

Application March 17, 1954, Serial No. 416,911

4 Claims. (Cl. 315—295)

This invention relates in general to variable voltage electrical systems, devices and methods and more particularly to a method, apparatus and circuit arrangements for varying in sequential manner the voltage of a series of electrical devices. The inventive method and arrangements for carrying out the former are such as to employ a voltage dividing device of substantially less rated wattage than the total wattage of the electrical devices in circuit.

Systems for power control wherein variable applied voltages are requisite are well known. These in general either involve the use of variable resistances, reactances, transformers or electronic rectifier means for varying voltages applied to current consuming devices. A common application of such a power control system is found in the control of lighting intensity for example in theaters, schools, churches, night clubs, display signs and the like. In such cases the initial cost of the control equipment and the installation thereof is extremely costly. This is likewise the case with respect to other applications wherein variable voltage is applied to a load, such as for example in resistance type heating elements, infra red lamps, electric stoves and the like.

The use of the heavily rated autotransformer, that is in terms of wattage, has become a widespread practice because of the obvious advantages and safety factors inherently afforded by autotransformer construction, not the least of which resides in its ability to provide an infinite range of voltage division without substantial heat losses and energy dissipation. The cost of autotransformers however is considerable and this is particularly true in the case of units having ratings of 1000 watts or more. Moreover, it is the present practice to match the autotransformer in any control circuit watt for watt with the maximum total wattage of the electrical devices in the particular circuit. Therefore, if a substantial economy can be effected in the installation of such control equipment, whatever the particular application may be, considerably greater numbers of commercial and household as well as industrial applications and installations would become available.

It is accordingly the principal object of this invention to provide a method, apparatus and a system for effecting such an economy with a circuit arrangement for carrying out said method by means of which one autotransformer of a given rated wattage can be employed to vary the input voltage of electrical current consuming devices having a total maximum wattage of several times that for which the autotransformer is rated.

A specific object of this invention in keeping with the foregoing object is the application of such method, apparatus and system to vary the illuminating intensity of electrical lighting devices.

Another object of this invention is to provide a system wherein the voltages between individual phases of a polyphase power supply and neutral are applied to separate ones or separate groups of the electrical devices in order to operate same and to provide switching means to sequentially connect a single voltage dividing device into the circuits for the individual ones or groups of electrical devices in order to vary voltage and accordingly their energy dissipation in sequence.

Furthermore, although it is a specific object of this invention to provide a method and means for controlling lighting intensities, it is another principal object to provide such a method, apparatus and system equally adapted to any other application in which variable voltage is applied to a load, such as resistance type heating elements, infra-red lamps, electric stoves and similar energy transfer devices.

Another object of this invention resides in the adaptability of the system to the inclusion of lighting devices or other current consuming devices having multiple filaments or equivalent elements each fed from separate phases of a multi-phase electrical power source. In the case of lighting devices, these are capable of being enclosed in a single envelope.

These and additional objects, features and advantages will become apparent as the following description proceeds, taken in conjunction with the accompanying sheet of drawings wherein:

Fig. 1 is a circuit diagram of the present invention and illustrating an application to a plurality of lighting devices.

Fig. 2 is a diagram of an alternative type of lighting device for the circuit of Fig. 1.

Fig. 3 is a schematic view of the mechanism for implementing the circuit of Fig. 1.

Referring now to the drawings and particularly to Fig. 1, the invention is therein illustrated in connection with three lamps 10, 11 and 12, which may be of the well known tungsten filament incandescent type, respectively connected between each phase I, II and III of any suitable three phase source of electrical current and a fourth or neutral lead, N. Lines 13, 14 and 15 are each provided with a set of normally closed contacts 16, 17 and 18 respectively. It will be apparent therefore, that when the main gang switch 20 is closed each of the three lamps 10, 11 and 12 will have the full voltage between its respective phase lead and neutral impressed across its filament so that all three lamps will be operating at full or maximum illuminating intensity.

Apparatus is provided which will be described subsequently by means of which the following sequential contact action is provided:

Contacts 21 and 22 in lines 23 and 24 respectively and normally open, are closed and shortly thereafter line contact 16 is opened. The line 23 is connected between line 13 ahead of the line contacts 16, thru contacts 21 to the high voltage side H of a conventional autotransformer 25 having a conventional toroidal winding 26, core 27 and sliding contactor 28. The other or low voltage end L of the autotransformer 25 is connected to neutral thru line 29. The line 24 is connected between the line 13 on the other side of contacts 16, thru contacts 22 to the sliding contactor 28 of the autotransformer 25 at point 0.

It will be apparent therefore, that although contacts 16 are now open, the full voltage between phase I and neutral is still impressed across lamp 10 thru the circuit comprising contacts 21, line 23, autotransformer 25, sliding contactor 28, line 24 and contact 22.

The sliding contactor 28 of the autotransformer 25 is now rotated from H toward L. Incrementally less and less voltage is picked off the output side of the autotransformer and impressed across the filament of lamp 10 so that the illuminating intensity of the latter is diminished proportionally. When the sliding contactor 28 has been moved to point L on the autotransformer 25, zero voltage will exist across the lamp 10 and it will therefore be extinguished. At this time, contacts 21 and 22 are opened, 31 and 32 closed and shortly thereafter contact 17 is opened also. A voltage varying from zero to the full phase voltage, and in phase with the phase II voltage will then be applied to lamp 11 as sliding contactor 28 moves from L to H. Likewise the same sequence will apply in the case of the phase III voltage. Lamp 10 remains deenergized. The sequence related with respect to phase I and lamp 10 may now be repeated with phase II and lamp 11 by operation of the autotransformer 25, lamp 11 becoming dimmed to zero intensity as the sliding contactor 28 is moved thru a second 360 degrees from H to L.

When the contactor 28 reaches point L the second time, both lamps 10 and 11 are extinguished and only lamp 12 continues to glow at full illuminating intensity. Contacts 31 and 32 are now opened, contacts 35 and 36 closed and shortly thereafter contacts 18 in line 15 are opened. The voltage between phase III and neutral is therefore impressed across lamp 12 thru the circuit comprising contact 35, line 37, autotransformer 25, line 38 and contact 36. The sequence related with respect to phase I, lamp 10 and phase II, lamp 11 may now be repeated with phase III and lamp 12, lamp 12 being dimmed to zero illuminating intensity as the sliding contactor is rotated from point H to L the third time. After all three lamps are fully extinguished, contacts 35 and 36 are opened.

The entire set of three sequences as related may be reversed so that lamps 10, 11 and 12 are brought sequentially in reverse order from zero to maximum illuminating intensity; or rotation of the sliding contactor can be continued in the original direction, whereupon contacts 16, 17 and 18 are again closed and all other contacts are open and the full on position is again achieved and the cycles from full on to off repeated.

A mechanical arrangement for effecting the sequential operation of the various contacts described is illustrated in Figure 3. The autotransformer 25 is provided with a shaft 40 connected nonrotatably at one end to the sliding contactor 28 and at the other to a bevel pinion gear 41. The pinion gear 41 is arranged to mesh with another bevel gear 42, preferably having a greater number of teeth. The bevel gear 42 is fixed to a shaft 43 to which are also affixed a series of four cam members 44, 45, 46 and 47. Rotation of the shaft 43 is effected by a control knob 48 affixed to an end thereof. The shaft 40 and the sliding contactor are rotated accordingly.

It is preferable that the gear ratio between gears 42 and 41 is such that one complete 360 degree revolution of the control knob 48 will turn the gear 41 thru three revolutions, or 1080 degrees, to perform the three sequences previously described with one revolution of the control 48. Obviously, a straight 1:1 ratio may be had but the 3:1 ratio for three sequences is preferable and more convenient for an operator. Any other ratio and equivalent number of sequences may of course be arranged.

Each of the cams 45—47 is provided with a cam follower 48, 49 and 50 respectively connected to operate minature switches housing contacts 16, 17 and 18. The cam 44 is provided with three cam followers 51, 52 and 53 respectively connected to operate three miniature switches housing contact pairs 21, 22; 31, 32; and 35, 36.

A conducting surface 30 is provided on the autotransformer overlaying insulated portion 39 and connected to the high voltage end H of the winding 26 to provide a small lead time to facilitate the cam-switch operation. The cam surfaces and their positions with respect to the followers for operating the miniature switches are substantially as shown in the full on position in Figure 3 and are arranged to effect the sequences of contact action described hereinbefore with respect to the operation of the circuit.

It will be apparent therefore that with this arrangement a method and system is provided where current consuming devices of for example 3000 watts can be sequentially varied with a single autotransformer of for example, 1000 watt rating, thereby effecting substantial economy in equipment.

Also, although in this illustration only three single lamps 10, 11 and 12 are shown, each may represent a plurality of lamps or other devices in parallel. In this illustration this could comprise for example ten 100 watt lamps in the case of the assumed 3,000 watts of illuminating power. Moreover, the invention lends itself readily to substitution of special multifilament lamps for the lamps 10, 11 and 12, such as the three filament, single envelope lamp 60 shown in Figure 2. Such filaments could, for example, be arranged as illustrated in a Y connection with a central tap, each filament being connected to one of the phases of the poly-phase power supply.

It should also be understood that although the switches 16, 17 and 18 have been illustrated as being connected directly into the power lines, they may also be connected in control lines of electrically operated relays or contactors where such relays or contactors are connected in the power lines for the handling of heavy currents.

Having described my invention in detail, it will be apparent that certain modifications and changes can be readily effected, for example, to adapt this system to any single or multiple phase power supply provided with more than two nominal conductors. Therefore, all such changes and modifications as come within the spirit of the invention are intended as being within its scope, best defined in the appended claims.

I claim:

1. A system for sequentially controlling the consumption of electrical energy comprising, a plurality of electrically energized energy consuming devices different ones of which are directly connected between individual conductors and neutral of a source of electrical current, a single autotransformer of rated wattage substantially less than the sum of the wattages of the entire load and having an input terminal, a sliding contactor on said autotransformer, switch means individual to each of said current carrying conductors, circuit means extending from each said switch means to said input terminal and said sliding contactor on said autotransformer, and means including a plurality of cams operated in response to movement of the sliding contactor to sequentially operate said switch means to sequentially include said single autotransformer in circuit with each of said conductors and respectively associated energy consuming devices one at a time while excluding it from all other said conductors so that the energy consumption of all of such devices may be sequentially decreased from full consumption to zero or increased from zero consumption to full.

2. The system set forth in claim 1 in which each of said switch means includes a pair of switches operated by said cams to connect said autotransformer in an energizing circuit with the related individual conductor and the related energy consuming device.

3. A load controlling circuit comprising a plurality of individual conductors and a common conductor; a plurality of load devices each adapted to be connected between one of said individual conductors and said common conductor; a plurality of first switch means, each of said first switch means being connected in series with one of said individual conductors and one of said load devices and being operable to open and close an energizing circuit through the connected load device including the individual conductor and said common conductor; an autotransformer including an element adjustable through a series of cycles of operation in each of which said autotransformer is conditioned to supply energy varying between a maximum amount and a minimum amount; a plurality of second switch means, each of said second switch means being operable to connect said autotransformer between one of said individual conductors and the related load device so that energy is supplied to the load device through the autotransformer; and control means interconnecting said adjustable element, said plurality of first switch means, and said plurality of second switch means for operation in a predetermined sequence, said control means including means for operating said first and second switch means to control the connection between one of said load devices and the related individual conductor and to connect this load device to said autotransformer in response to each cycle of operation of said adjustable element.

4. The load controlling circuit set forth in claim 3 in which said control means includes means for sequentially actuating said first switch means and for opening and closing each of said second switch means to render said autotransformer effective to control each of said load devices in sequence and in synchronism with cyclic operation of said adjustable element.

References Cited in the file of this patent

UNITED STATES PATENTS

| | | |
|---|---|---|
| 468,500 | Gorges | Feb. 9, 1892 |
| 552,496 | Mayrhofer | Dec. 31, 1895 |
| 1,019,422 | Button | Mar. 5, 1912 |
| 1,731,772 | Greenwalt | Oct. 15, 1929 |
| 1,749,612 | Scott | Mar. 4, 1930 |
| 1,764,411 | Masek | June 17, 1930 |
| 1,977,124 | Genrich | Oct. 16, 1934 |
| 2,192,673 | Cooper | Mar. 5, 1940 |
| 2,200,682 | Runkel | May 14, 1940 |
| 2,657,338 | Williams | Oct. 27, 1953 |